July 12, 1960   G. H. HALVORSON   2,944,884
METHOD OF BENEFICIATING REDUCING AND BRIQUETTING IRON ORE
Filed Jan. 23, 1958
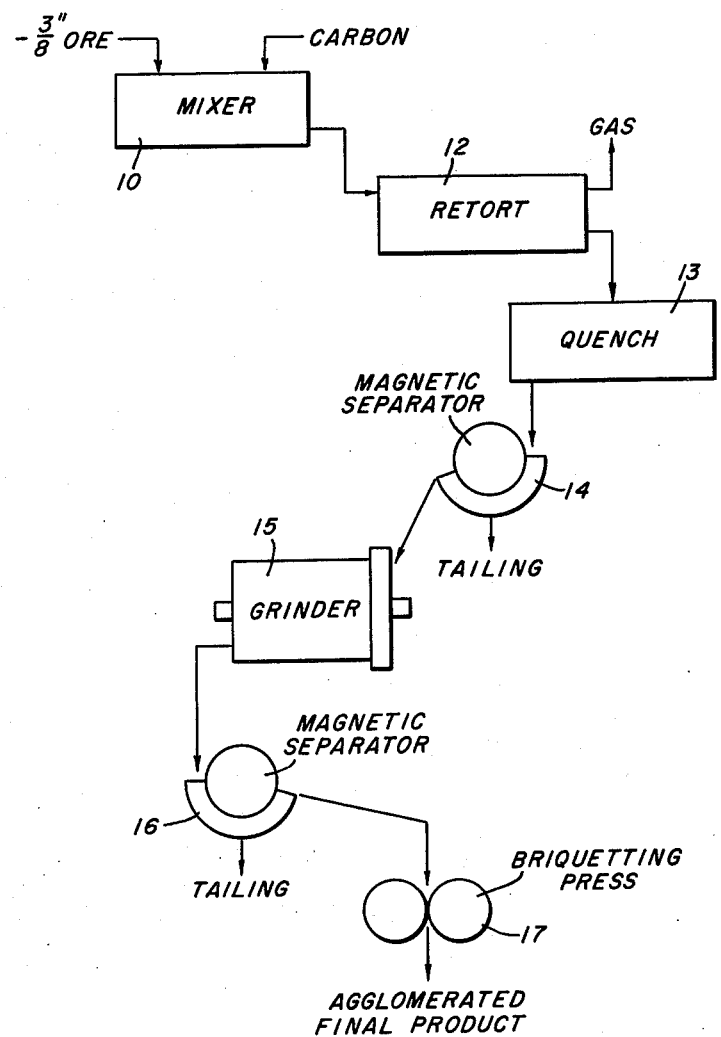
INVENTOR
GAYLORD H. HALVORSON
By Donald G. Dalton
Attorney United States Patent Office 2,944,884
Patented July 12, 1960

2,944,884

METHOD OF BENEFICIATING REDUCING AND BRIQUETTING IRON ORE

Gaylord H. Halvorson, Duluth, Minn., assignor to United States Steel Corporation, a corporation of New Jersey Filed Jan. 23, 1958, Ser. No. 710,640

3 Claims. (Cl. 75—33)

This invention relates to an improved method of producing high iron concentrates from low grade ores, such as non-magnetic taconite.

Conventional procedures for recovering iron concentrate from low grade ore involve grinding the ore to a fineness at which iron-bearing particles are liberated from gangue particles and separating these particles from one another magnetically. If the iron occurs as a non-magnetic mineral, such as non-magnetic hematite, the ore can be subjected to a reducing roast to convert the iron mineral to magnetite and thus make magnetic separation possible. Iron in the concentrate remains as an oxide which subsequently must be reduced to metallic iron, usually in a blast furnace. The concentrate is of course recovered in a finely divided form, and the particles must be agglomerated before they can be used for most purposes. If the particles are charged to a blast furnace, agglomeration is particularly difficult, since the particles must be at least partially fused together, as by sintering, nodulizing in a rotary kiln, or balling and pelletizing in a shaft furnace or traveling grate, to furnish the necessary mechanical strength.

An object of my invention is to provide an improved method of producing high iron concentrates which contain iron in a fully reduced form suitable for replacing scrap in a steel making process, such as an open hearth or an electric furnace.

A further object is to provide an improved method of producing high iron concentrates in which the grinding step is facilitated by first converting the iron to a form more readily broken away from the gangue, namely non-malleable iron carbide.

A further object is to provide an improved method of producing such concentrates in which low cost readily available materials can be utilized, namely taconite and peat char.

The single figure of the drawing is a simplified schematic flow sheet of my method.

According to my method iron ore crushed approximately to minus ⅜ inch or finer is mixed with carbon of a reactive form in a mixer 10 of any conventional construction, and the mixture is charged to a retort 12. The mixture contains at least fifty percent more carbon than the theoretical quantity needed for complete reduction of the iron in the ore to metallic iron, the gross proportions of course depending on the analyses of the materials. The ore preferably is a hematitic taconite which has an iron content of 20 to 50 percent and a silicious gangue. Although my method is fully operable with magnetic taconite or higher grade iron ores, it is most advantageous with ores of the aforementioned type which are difficult to utilize and yet exist abundantly in many places, for example, in the Mesabi Range of Minnesota. The carbon preferably is peat char which is low in both volatiles and sulfur, although equivalent sources are possible. Peat char has advantages that it is completely non-coking and hence highly reactive. Peat bogs also exist proximate to the Mesabi taconite deposits. A suitable peat char can be prepared by draining and drying peat and carbonizing the dried particles at a temperature of about 900 to 1400 F. in suspension in a vertically movable gas stream. The necessary heat can be derived from partial combustion of the char particles and by external heat applied to the walls of the vessel. Since the procedure for preparing the char is not part of my invention, no more detailed description is deemed necessary.

In the retort the charge is heated to a temperature of about 1600 to 2000 F., or preferably about 1900 to 2000 F., for a prolonged period, for example about 18 to 21 hours. Heat is applied externally of the retort. Gas formed during the reducing reactions is conducted from the retort, and no additional gas is introduced from outside. Since the sulfur content of the charge is low, there is no need to include limestone in the charge. The heating period is sufficiently long that the iron not only is fully reduced, but also carburized. Sufficient carbon is absorbed to produce iron carbide particles that lose their malleability on fast cooling. The iron particles should contain at least about 0.65 percent carbon. After completion of treatment in the retort 12, the charge is removed and introduced to a water or gas quenching device 13 of any conventional construction to provide the desired fast cooling, which produces a martensitic structure within the reduced particles. If a gaseous quench is used, the gas should of course be non-oxidizing (i.e. inert or reducing). The quench can be omitted if the degree of carburization is increased to produce a carbon content of at least about 1.0 percent in the iron particles.

Next the charge is ground to liberation size and the carburized iron particles and gangue particles are separated magnetically. The exact procedure for grinding, sizing and separating can vary with different ores and can be conducted with the reduced ore either wet or dry, but in most instances it is necessary to grind to about 80 percent minus 300 mesh to achieve liberation. In the flowsheet illustrated the reduced and carburized charge goes first to a conventional magnetic separator 14 which separates a rough concentrate and a tailing product. The rough concentrate from this separator goes to a ball mill 15 which grinds the particles to suitable fineness for a further concentrating step. If the concentrate is wet, it should be ground under a non-oxidizing gas. The ground rough concentrate goes from the ball mill to another magnetic separator 16, which separates a final concentrate and another tailing product. The final concentrate goes to a conventional briquetting press 17 which forms the product into agglomerates of high purity carburized iron suitable for use as scrap in a steelmaking process. If a binder is added, it should be of a sulfur-free material. It is apparent the grinding operation can be conducted in several steps with intermediate sizing, if desired, according to conventional practice. However, the amount of grinding to reduce the product to any given fineness is substantially less than is usually required for low grade iron ores by virtue of the tendency of the hard iron carbide particles to break away from the gangue particles. The method typically produces concentrates containing well over 90 percent iron, 2 percent or less silica, and less than 0.030 percent sulfur.

To illustrate further the ways my invention can be practiced, I offer the following specific examples.

*Example 1*

I ground three parts by weight of non-magnetic taconite which contained 38.8 percent iron and 43.7 percent silica to pass a ⅛ inch screen and mixed it with one part by weight of peat char which contained about 20 percent ash mostly silica. The acid insoluble content of the ore, usually determined for control work, was 46.4 percent. I charged the mixture to a retort which I then heated to 1900 F. for 18 hours. The gas evolved during reduction was piped outside the retort and discharged into the atmosphere. At the end of the heating period I removed the reduced charge from the retort and immediately submerged the charge in water. I made a magnetic separation and ground the rough concentrate under a reducing gas in a ball mill. On repeated magnetic separation, I obtained a final concentrate of the following analysis:

| | Percent |
|---|---|
| Iron | 96.0 |
| Silica | 1.27 |
| Combined carbon | 1.01 |
| Graphitic carbon | 0.02 |
| Sulfur | 0.018 |
| Manganese | 0.05 |
| Phosphorous | 0.005 |
| Aluminum oxide | 0.10 |
| Combined oxygen | Remainder |

*Example 2*

In the wet grinding operation, it is necessary, in order to avoid partial reoxidation of the iron particles, to grind under a reducing or inert gas. To eliminate the need for such gas, the concentrate can be handled in dry form. The fully reduced iron has about 2½ times the magnetic permeability of magnetite, whereby dry separations are more feasible.

I heated a similar charge of taconite and peat char to 2000 F. for 21 hours and thereafter quenched the charge dry. On pulverizing the dry charge and separating the particles magnetically, I obtained a final concentrate of the following analysis:

| | Percent |
|---|---|
| Iron | 96.00 |
| Silica | 2.10 |
| Combined carbon | 1.45 |
| Graphitic carbon | .02 |
| Sulfur | .017 |
| Manganese | .06 |
| Phosphorous | .006 |
| Aluminum oxide | .012 |
| Combined oxygen | Remainder |

From the foregoing description, it is seen that my invention affords a simple method of producing a high grade iron concentrate from low grade ores. The method not only produces a premium product but does so through use of inexpensive readily available materials whose utilization has been quite limited.

While I have shown and described certain preferred embodiments of my invention, it is apparent that other modifications may arise. Therefore, I do not wish to be limited to the disclosure set forth but only by the scope of the appended claims.

I claim:

1. A method of preparing an iron concentrate from an ore which contains iron oxide and silicious gangue comprising mixing crushed ore with completely non-coking and highly reactive peat char in proportions sufficient to furnish at least 50 percent excess carbon over that required for complete reduction of the iron oxide present in the ore, introducing the mixture of ore and peat char to a retort, heating the retort externally for a prolonged period to maintain the mixture of ore and peat char at a temperature of about 1600 to 2000 F. while conducting gases therefrom without introducing additional gas from outside, thereby reducing the iron oxide to metallic iron and carburizing this iron, the carbon content of the carburized iron being at least 0.65 percent, rapidly cooling the reduced product to render the iron particles non-malleable whereby they are easily broken away from the gangue particles, grinding the reduced product to liberation size, magnetically separating iron particles in the product from gangue particles therein, and agglomerating the iron particles.

2. A method as defined in claim 1 wherein the reduced ore is cooled by quenching in water to impart a martensitic structure to the carburized iron, and the grinding and separating steps are conducted with the ore wet.

3. A method as defined in claim 1 wherein the reduced ore is cooled by quenching in gas and the grinding and separating steps are conducted with the ore dry.

References Cited in the file of this patent

UNITED STATES PATENTS

| 2,339,793 | Moeklebust et al. | Jan. 25, 1944 |
| 2,508,515 | Hayward et al. | May 23, 1950 |
| 2,523,138 | Oppegard | Sept. 19, 1950 |
| 2,593,398 | Kalling | Apr. 22, 1952 |
| 2,771,354 | Moeklebust et al. | Nov. 20, 1956 |

FOREIGN PATENTS

| 444,057 | Great Britain | Mar. 5, 1936 |